Sept. 19, 1933.  M. D. KLISE  1,927,458
HARROW
Filed Sept. 1, 1932  4 Sheets-Sheet 1

Inventor
M.D.Klise
By C.A.Snow&Co.
Attorneys.

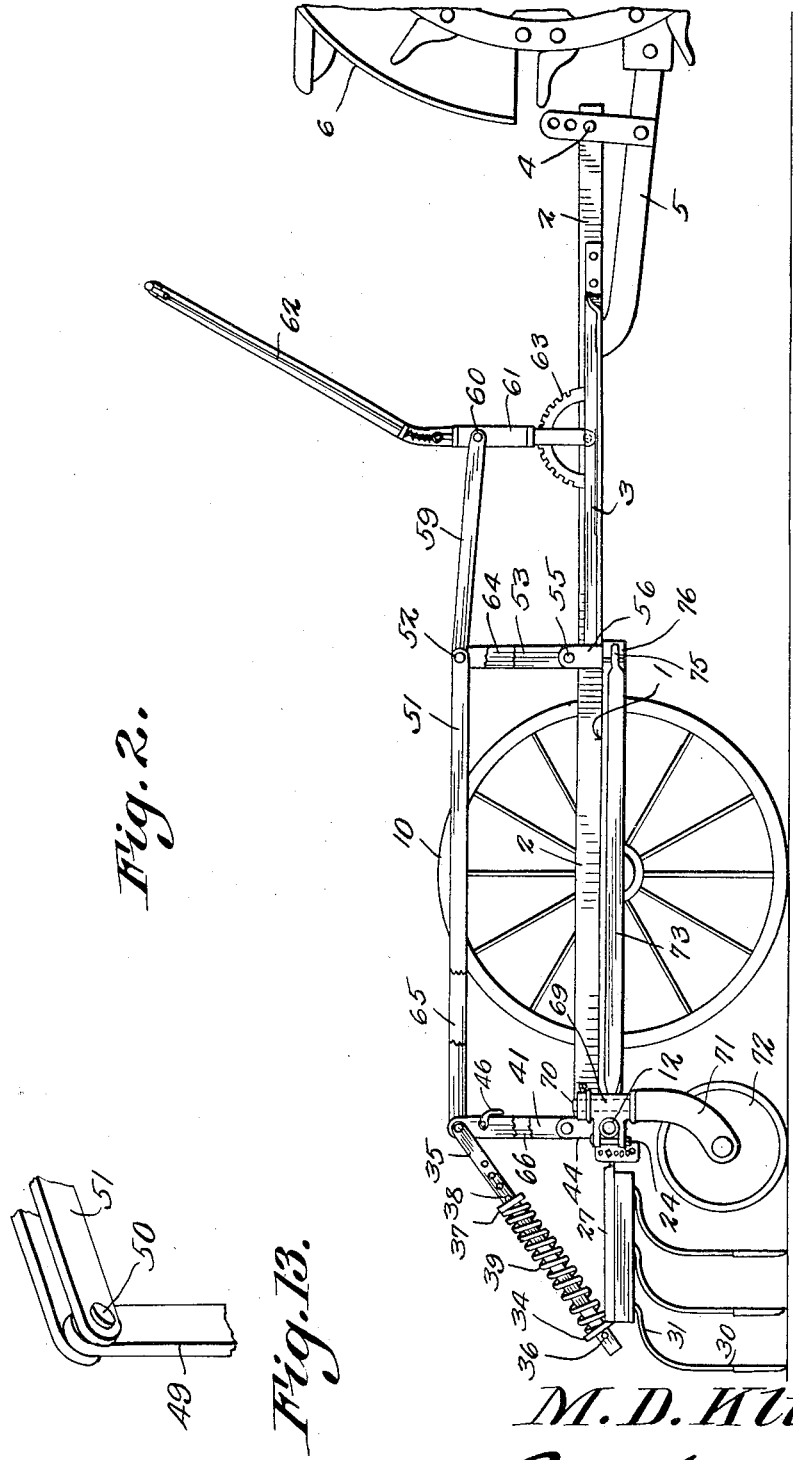

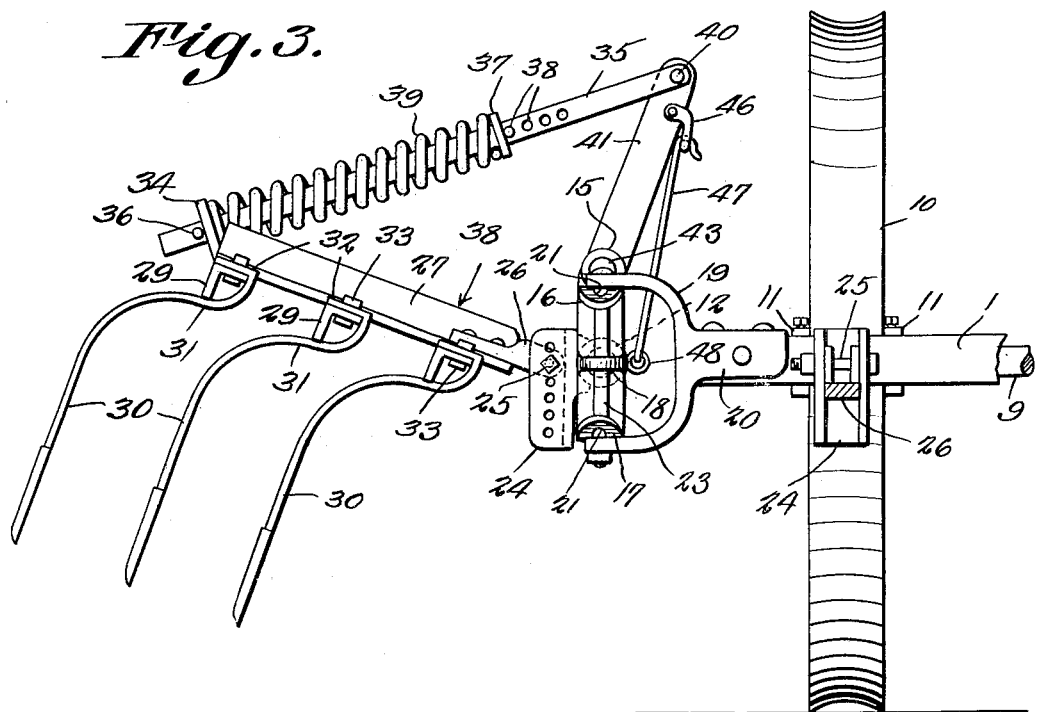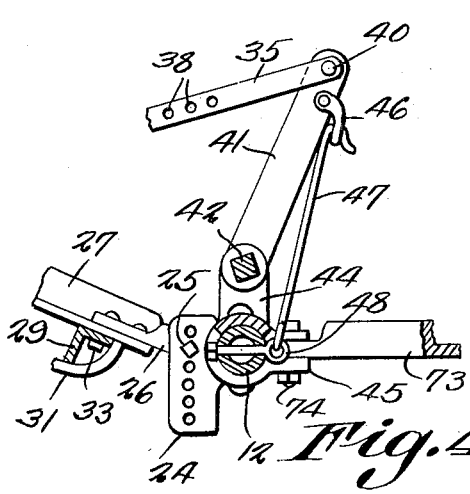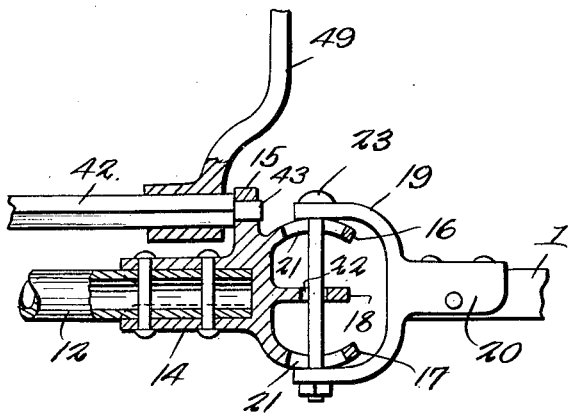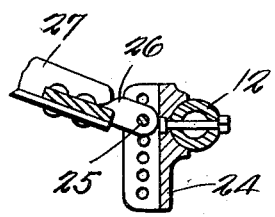

Sept. 19, 1933.  M. D. KLISE  1,927,458
HARROW
Filed Sept. 1, 1932  4 Sheets-Sheet 4
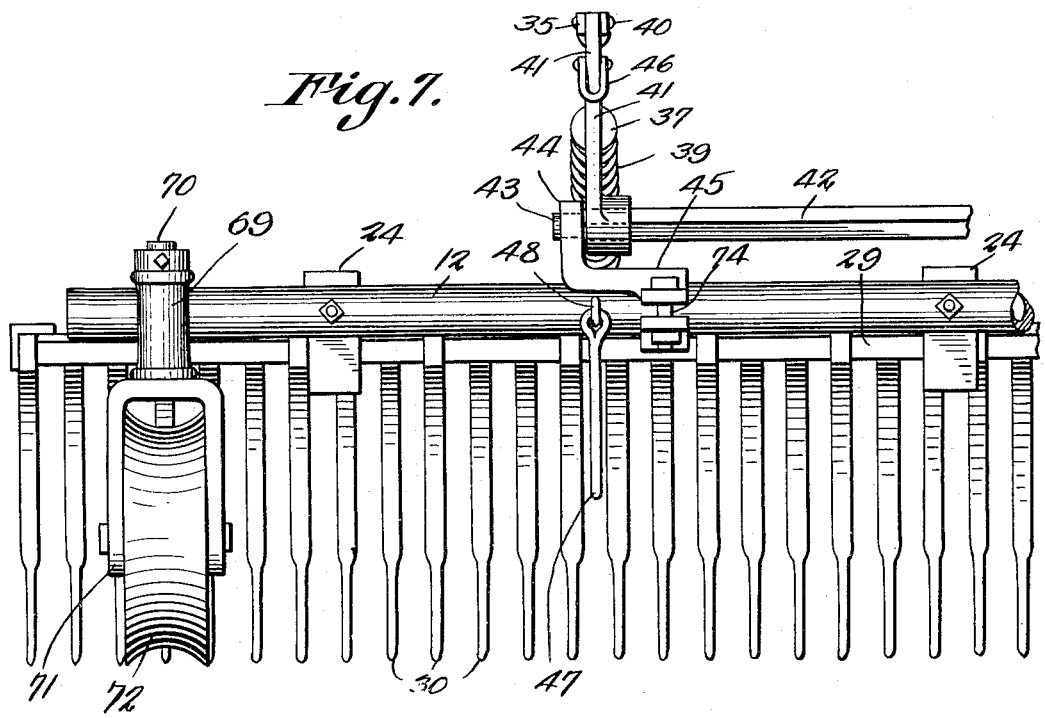
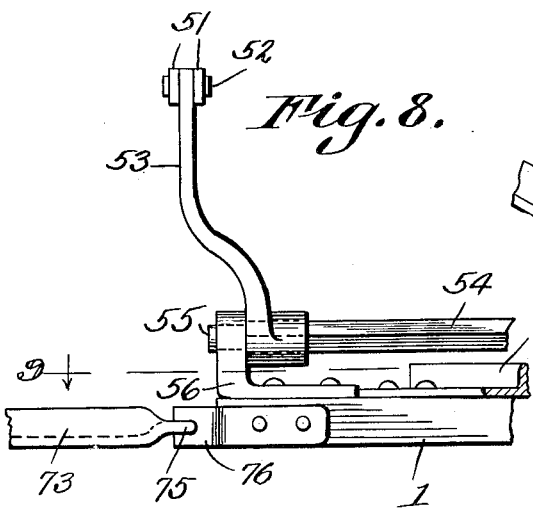
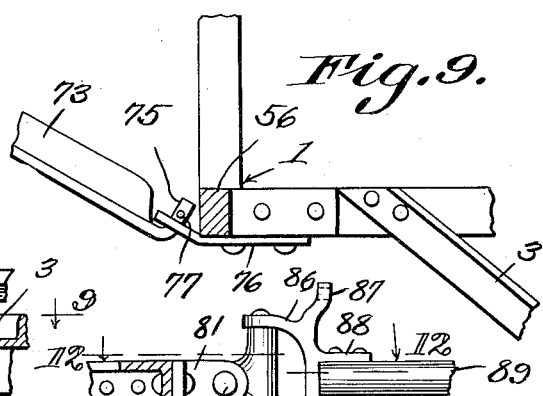
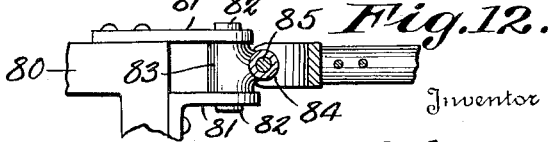
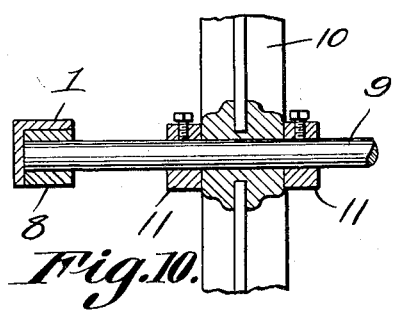
Inventor
M. D. Klise
By C. A. Snow & Co.
Attorneys.

Patented Sept. 19, 1933

1,927,458

UNITED STATES PATENT OFFICE 1,927,458

HARROW

Marion D. Klise, Marshalltown, Iowa

Application September 1, 1932
Serial No. 631,417

3 Claims. (Cl. 97—235)

The device forming the subject matter of this application is a cultivator or weeder, and the invention aims to provide novel means whereby the side sections of the machine may be folded forwardly, to decrease the width of the machine, whilst the machine is being run along the highway, or to enable the machine to pass through a gate or other restricted space. Another object of the invention is to provide novel means for operating the various sections of the device. A further object of the invention is to improve the construction of the cultivator tooth.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 2 is a side elevation;

Fig. 3 is a fragmental transverse section on the line 3—3 of Fig. 1;

Fig. 4 is a section on the line 4—4 of Fig. 1;

Fig. 5 is a section on the line 5—5 of Fig. 1;

Fig. 6 is a section on the line 6—6 of Fig. 1;

Fig. 7 is a section on the line 7—7 of Fig. 1;

Fig. 8 is a section on the line 8—8 of Fig. 1;

Fig. 9 is a section on the line 9—9 of Fig. 8;

Fig. 10 is a section on the line 10—10 of Fig. 1;

Fig. 11 is an elevation showing a slight modification;

Fig. 12 is a section on the line 12—12 of Fig. 11;

Fig. 13 is a fragmental view illustrating a detail of the preferred form.

Figure 1:
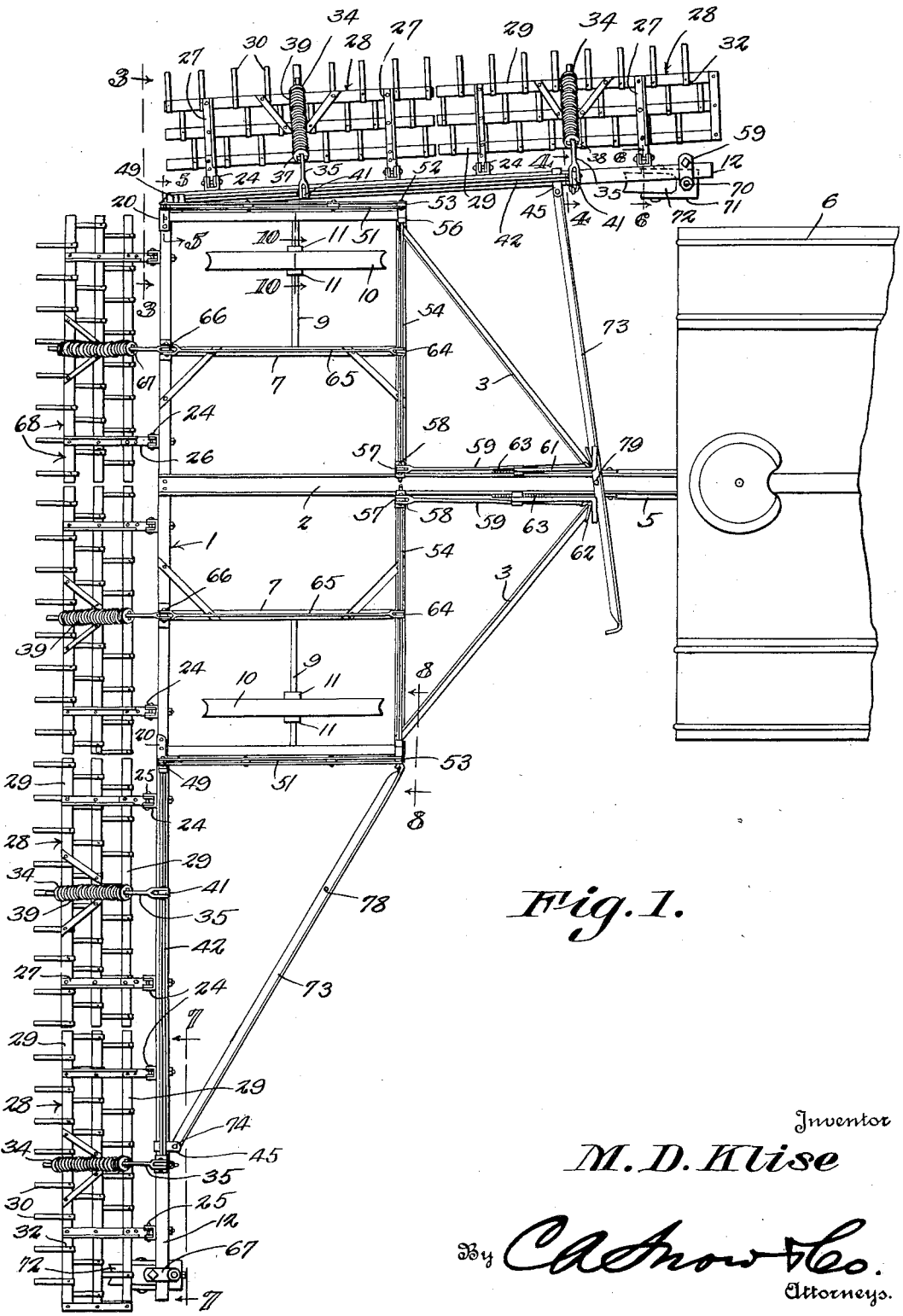
Fig. 1 shows, in top plan, a device constructed in accordance with the invention, one of the side members of the machine being folded inwardly and forwardly, and the other of the side members of the machine being extended laterally and in the position which it will assume when the machine is in use.

In carrying out the invention, there is provided a main frame 1, which, as shown in Fig. 1, may be rectangular in top plan. A tongue 2 extends across the frame 1 from front to back, and projects forwardly with respect to the frame, the tongue being secured to the frame. The forward portion of the tongue 2 is sustained from the frame 1 by means of braces 3. Fig. 2 shows that the tongue 2 may be connected at 4, or in the usual way, to the draw bar 5 of a tractor 6. It appears in Fig. 1 that the main frame 1 embodies intermediate bars 7. These bars 7, and the end portions of the frame 1 carry bearings 8 (Fig. 10) in which is mounted an axle 9, there being an axle at each end of the frame 1, as shown in Fig. 1, and the axles being arranged at right angles to the draft line. The main frame 1 is supported on ground wheels 10, journaled for rotation on the axles 9, and capable of being adjusted longitudinally of the axles, so as to clear the rows of standing plants. Set collars 11 (Fig. 10) may be placed on the axles 9, to hold the ground wheels 10 in any position to which they may have been adjusted, longitudinally of the axles 9.

Side members 12 are provided. One of the side members 12 is shown folded forwardly in Fig. 1, to the position which it will assume whilst the device is being moved along the highway or being moved through a gateway or other restricted space. The lowermost side member 12 in Fig. 1 is in the position which it will assume whilst the cultivating is going on. It appears in Fig. 5 that the side members 12 may be of tubular construction, if desired.

The inner ends of the side members 12, that is, the ends which are nearest to the main frame 1, are received in sockets 14, shown in Fig. 5. The sockets 14 have upstanding bearings 15, the purpose of which will be pointed out hereinafter. The sockets 14 have inwardly extended, curved, upper arms 16, correspondingly shaped lower arms 17, and straight intermediate arms 18, as Fig. 5 will show. The arms 17 and 16 of the sockets 14 extend between forks 19 having shanks 20, the shanks of the forks being secured to the rear corner portions of the main frame 1. In the arms 16 and 17 there are elongated slots 21, and there is an opening 22 in the arm 18. In the slots 21 and in the opening 22 are mounted pivot elements 23 that are secured in the forks 19.

Clevises 24, shown in Figs. 4 and 6, and in Fig. 7, are secured to the side members 12. Pivot elements 25 are vertically adjustable in the clevises 24, and on the pivot elements 25, hangers 26 (Figs. 4 and 6) are mounted to swing vertically, these hangers being connected to the short longitudinal bars 27 of outer cultivator sections 28, including long transverse bars 29 arranged at right angles to the longitudinal bars 27. It can be seen in Fig. 4, for instance, that the transverse bars 29 of the outer cultivator sections 28 are in the form of angle members, each including a horizontal flange, and a vertical depending flange. The cultivator teeth are marked by the numeral 30, and the reader will note, in Fig. 3, that each tooth 30 has a reversely curved upper portion 31. This reversely curved portion 31 of the tooth 30 extends across the lower edge of the vertical flange of the transverse bar 29, in contact therewith. The said curved portion 31 extends upwardly across the edge of the horizontal flange of the transverse bar 29 and terminates in a finger 32 overlapped on the top of the horizontal flange of the bar 29 and connected thereto by a securing element 33. A simple but very strong mounting for the cultivator tooth 30 thus is afforded.

The rearmost transverse bars 29 of the cultivator sections 28 carry upstanding brackets 34 (Fig. 3) in which combined lifting and thrust rods 35 have limited reciprocation. Pins 36 or the like, mounted in the rods 35, behind the brackets 34, limit the downward swinging movement of the outer cultivator sections 28 with respect to the rods 35. Abutments 37 are mounted on the rods 35 for adjustment longitudinally of the rods, and are held in adjusted positions, by the simple means shown at 38, for example, and requiring no description. Compression springs 39 surround the rods 35, the forward ends of the springs engaging the abutments 37, and the rear ends of the springs engaging the brackets 34.

The forward ends of the lifting and thrust rods 35 are pivoted at 40 to crank arms 41 mounted on squared shafts 42 (Fig. 7). The squared shafts 42 have journals 43 at their ends, and the journals on the inner ends of the said shafts are mounted to turn in the bearings 15 (Fig. 5) that are carried by the sockets 14, and, therefore, by the side members 12. The journals 43 on the outer ends of the shafts 42 (Fig. 7) are mounted to rotate in bearings 44 held by clamps 45 on the side members 12.

Keepers 46 (Figs. 3 and 4) are mounted on certain of the arms 41, and are adapted to be engaged by hooks on the upper ends of the suspension rods 47, the lower ends of the suspension rods being pivotally mounted on eye bolts 48 carried by the side members 12. The obvious purpose of the parts 47 and 46 is to hold the outer cultivator sections 28 elevated, as disclosed in Fig. 3 of the drawings.

At their inner ends, the shafts 42 have upstanding arms 49 (Figs. 13 and 5), and these arms are connected by detachable pivot elements 50 with double-walled, forwardly extended links 51. The forward ends of the links 51 are pivoted at 52 (Fig. 8) to upstanding arms 53 on the outer ends of squared shafts 54, the shafts 54 having end journals 55 mounted to turn in bearings 56 on the forward part of the frame 1, the shafts 54 being arranged at right angles to the draft line, and extending inwardly from the outer ends of the main frame 1. On the inner ends of the shafts 54 there are upstanding arms 57 (Fig. 1) and to the arms 57 are pivoted at 58, forwardly extended links 59 (Fig. 2), pivoted at 60 to upwardly and forwardly extended levers 61, fulcrumed at their lower end on the tongue 2. The levers 61 carry latch mechanisms 62, adapted to cooperate with segments 63 on the tongue 2.

The shafts 54 on the forward part of the frame 1 are provided with upwardly extended intermediate arms 64 (Fig. 1), the arms 64 being pivoted to rearwardly extended links 65 that are pivoted to the upper ends of levers 66 mounted to swing on the back part of the frame 1. The part 41 of Fig. 3 will illustrate the construction of the lever 66 sufficiently, the difference being that the part 41 is carried by the squared shaft 42, whereas the corresponding lever 66 is simply fulcrumed at its lower end on the rear portion of the main frame 1. The pressure and raising mechanism 67 is of the kind shown at 35—39 in Fig. 3 and is connected to inner cultivator sections 68, located immediately behind the main frame 1, the construction, mounting and details of the inner cultivator sections being the same as those of the outer cultivator sections 28, which are mounted for vertical swinging movement on the side members 12.

In Figs. 1 and 7, it is shown that bearings 69 are held by clamps on the side members 12, near to the outer ends thereof, and in the bearings 69, the shanks 70 of forks 71 are mounted to turn, caster wheels 72 being journaled in the forks. The function of the caster wheels 72 is to support the side members 12, regardless of whether the side members are outwardly and laterally extended, as shown at the bottom of Fig. 1, or forwardly extended, as shown at the top of that figure.

In order to keep the side members 12 in the outstanding position shown in the lower part of Fig. 1, braces 73 are provided, and have their rear or outer ends pivotally connected at 74 with the side members 12. On the inner ends of the braces 73 there are hooks 75 (Fig. 9) adapted to be engaged with keepers 76 on the forward corners of the main frame 1, the hooks 75 being retained detachably in the keepers 76 by the pins 77 of Fig. 9, or in any other suitable manner. Intermediate their ends, the braces 73 are provided with openings 78 (Fig. 1), and when the side members 12 are folded inwardly, as shown at the top of Fig. 1, the openings 78 in the keepers 76 may receive an upstanding pin 79 on the tongue 2, to retain the side members 12 in their forwardly folded position.

The pivotal connection between the side member 12 and the frame 1, shown in Fig. 5, is useful, but is subject to modification, within the spirit of the invention. Thus, in Figs. 11 and 12, the numeral 80 marks the main frame of the machine, corresponding to the frame 1. There are two outstanding brackets 81 on the frame, in which are journaled the trunnions 82 of a block 83 carrying a vertical tubular bearing 84, in which a shaft 85 is mounted to turn, the shaft 85 being connected to the arms of a fork 86 carrying a bearing 87, the bearing 87 having the function of the bearing 15 of Fig. 5. The fork 86 has fingers 88, between which the side member 89 is secured, the side member corresponding to the side member 12 of the preferred form of the invention.

Assuming that the side members 12 are in the outstanding position shown at the bottom of Fig. 1, and that the suspension rods 47 of Fig. 3 are cast off the keepers 46, all of the cultivator sections 28 and 68 will assume the position shown in Fig. 2. The springs 39 then function to keep the cultivator teeth 30 yieldably in contact with the ground. The operator can raise or lower the outer cultivator sections 28 by a train of parts including the lever 61, the link 59, the arm 57, the shaft 54, the arm 53, the link 51, the arm 49, the shaft 42, the arm 41, the rod 35, and the bracket 34. In the same way, the inner cultivator sections 68 can be raised and lowered from the shaft 54 by way of the arm 64, the link 65, the lever 66, and the mechanism shown at 67 in Fig. 1, that mechanism being a duplicate of the corresponding mechanism shown at 35 and 39 in Fig. 3.

When the operator wishes to fold the side members 12 and the corresponding cultivator sections 28 forwardly, into the position of Fig. 1, the pivot element 50 of Fig. 13 is removed, thereby setting the links 51 free from the arms 49 on the inner ends of the shafts 42, and the side members 12 may be swung forwardly on the pivot elements 23 of Fig. 5. The braces 73 are arranged crosswise of the tongue 2, and the holes 78 in the braces receive the pin 79 on the tongue. When the side members 12 are folded forwardly, they are supported by the caster wheels 72, which roll on the ground. The caster wheels also support the side members 12 when they are extended laterally, as shown at the bottom of Fig. 1.

With the side members swung forwardly, the outer cultivator sections 28 can be hooked up by the parts 47 and 46, as shown in Fig. 3, and the inner cultivator sections 68 can be hooked up in the same way, holding all of the cultivator teeth 30 clear of the ground. The construction shown at 21—22—23 in Fig. 5, lets the side member 12 have slight up and down movement, regardless of whether the side member 12 is forwardly extended or laterally extended, and inequalities in the ground will be taken care of as the caster wheel 72 rolls over them. The modified connection of Figs. 11 and 12 also permits this movement, since the trunnions 82 can rock about a horizontal axis in the brackets 81, the bearing 84 permitting the vertical shaft 85 to turn. The structures shown in Figs. 5 and 11 enable the side member to have a compound movement in which there is both a vertical and a horizontal component, but the cultivator teeth 30 are always kept in proper relation to the ground, when the teeth are in working position, since the side member 12 cannot rotate on its axis.

Although the side sections 28 are shown as being forwardly folded, it will be understood that if the inner cultivator sections 68 are removed, so as to be out of the way, the side sections 28 can be folded backwardly, as well as forwardly.

What is claimed is:

1. A machine of the class described, embodying a wheel-mounted main frame, a side member pivoted to the end of the main frame and foldable forwardly with respect to the main frame, a cultivator section pivoted to the side member, for raising and lowering, and means under the control of an operator mounted on the main frame and extended upon the side member for raising and lowering the cultivator section with respect to the side member, when the side member and the cultivator section are in outstanding, working position with respect to the main frame, said means being disconnectably flexible, to permit the side member to be folded, as aforesaid.

2. A machine of the class described, embodying a wheel-mounted main frame, a first cultivator section located behind the main frame and pivoted thereto for raising and lowering, a side member pivoted to the end of the main frame and foldable forwardly with respect to the main frame, a second cultivator section pivoted to the side member, for raising and lowering, and means under the control of an operator mounted on the main frame and connected to the first and second cultivator sections for raising and lowering the said sections, when the side member and the second cultivator section are in outstanding, working position with respect to the main frame.

3. A machine of the class described, embodying a wheel-mounted main frame, a side member pivoted to the end of the main frame and foldable forwardly with respect to the main frame, a cultivator section pivoted to the side member for raising and lowering, a first shaft mounted to rock on the side member, a second shaft mounted to rock on the main frame, the shafts having arms, a link pivoted to the arms, means under the control of an operator for actuating the second shaft, and a raising and lowering connection between the first shaft and the cultivator section.

MARION D. KLISE.